United States Patent Office.

IRA WOOD, OF WOODSTOCK, VERMONT.

*Letters Patent No.* 81,237, *dated August* 18, 1868; *reissue No.* 3,157, *October* 6, 1868.

IMPROVED COMPOSITION FOR TANNING.

The Schedule referred to in these Letters Patent and making part of the same.

TO ALL WHOM IT MAY CONCERN:

Be it known that I, IRA WOOD, of Woodstock, in the county of Windsor, and State of Vermont, have invented certain new and useful Improvements in the Composition of Liquids for Tanning Hides and Skins, of which the following is a full, clear, and exact description.

My invention consists mainly in the use, in the composition of liquids for tanning hides and skins, of the leaves of the different varieties of the oak, maple, willow, and beech trees, which I use separately or combined with each other, one or more, or all in equal or in any proportions, or of one or more, or all, of said kinds of leaves combined with alum, Glauber's salts, and nitric acid, in the manner hereinafter specified.

In making my improved tanning liquid, I take oak, maple, willow, or beech leaves, separately or combined, one or more, with each other, and mixed in such proportions as may be found best for the object to be obtained, and place as many of them in a brass or copper vessel as can well be pressed down below the top. I then put in as much water as will cover them, and apply sufficient heat to cause the water to boil smartly for about one hour. I then strain off the liquid, and to about forty gallons of the same I add about eight pounds of ground alum, about six pounds of Glauber's salts, and about two ounces of nitric acid, and stir the same until well mixed. Twenty gallons, or thereabouts, of the decoction of the leaves may be used in this composition, but I have found in practice that the best results will be effected with about forty gallons. This liquid should then be allowed to cool to about blood heat, and the hides and skins, after having been prepared in the usual way, placed in the liquid and thoroughly worked or handled for ten or twelve hours, or until well stained, after which they may remain at rest, adding from time to time more of the liquor made from boiling the leaves, to strengthen the liquor during the process of tanning; but no more alum, salts, or acids need be added after the first. In this process the hides and skins should be heated, as in the common method of tanning with bark liquor.

After the first part of the procees just described has been performed, and the hides well stained, the liquor should be strengthened from time to time with strong bark liquor until thoroughly tanned. Hides treated by this process will make sole leather of a superior quality.

In order to produce a softer leather and of a different color, instead of the leaves of the oak or the maple, I use the leaves of the willow, with either or both of the other two kinds. The willow leaves not only tend to make the leather soft and to change its color, but they prevent the liquor from fermenting and souring, even in very warm weather, which I find to be very important.

In order to produce leather of a different color from that produced by the use of the leaves of the willow, I use the leaves of the beech, and in about the same proportion as of the others. The beech leaves contain less of the tanning property than either of the other leaves above named, but they aid in the tanning process and change the color of the leather.

Instead of the leaves of the oak or maple, and in order to produce very soft leather to be used without further coloring, I make a tanning liquid of the leaves of the willow alone, adding to it the alum, salts, and acid, in the same proportions, and mixing the same in the manner above described. This liquor must be strengthened with more of the leaf liquor, from time to time, during the process of tanning the hides, which will be fully understood by all practical tanners.

Steam may be used for extracting the tanning material from the leaves, in which case they may be boiled in a tub or vat made of wood or other non-corrosive substances.

The leaves used for making my improved tanning liquids should be fully ripe, and may be gathered after having fallen from the trees, the action of the frost having no apparently injurious effect upon them.

In tanning hides and skins with my improved tanning liquids, the same rules may be observed as in tanning with the common bark liquor. And the strength of the liquid produced by boiling the leaves should, before adding the alum, salts, and acid, indicate about ten degrees by the barkometer, an instrument understood by all practical tanners.

The leather tanned by the use of the liquids hereinbefore described will be exceedingly tough and strong, and either very pliable, limber, and soft, or more firm and solid, according to the use for which it is intended and the treatment which it receives.

Having above described my said invention, and its mode of application, what I claim, and desire to secure by Letters Patent, is—

1. A tanning liquid, made of the leaves of the different varieties of the oak, or maple, or willow, or beech trees, used separately or combined with each other, or two, or more, or all, in equal or in any proportions, for the purpose and in the manner above set forth.

2. A tanning liquid, made of the leaves of the different varieties of the oak, or maple, or willow, or beech trees, used separately, or two, or more, or all of them together, in combination with alum, Glauber's salts, and nitric acid, in about the proportions specified, and for the purpose and in the manner above set forth.

IRA WOOD.

Witnesses:

GEO. R. BROWN,

EDMUND BURKE.